United States Patent [19]

Zirbes et al.

[11] Patent Number: 5,050,292
[45] Date of Patent: Sep. 24, 1991

[54] AUTOMATED METHOD FOR THE MANUFACTURE OF TRANSPONDER DEVICES BY WINDING AROUND A BOBBIN

[75] Inventors: Glen L. Zirbes, Silver Lake; Leonard D. Hadden, Minneapolis, both of Minn.; Philip R. Troyk, Morton Grove, Ill.

[73] Assignee: Trovan Limited, Douglas, Isle of Man

[21] Appl. No.: 530,048

[22] Filed: May 25, 1990

[51] Int. Cl.⁵ .......................... H01F 7/06; H05K 7/02
[52] U.S. Cl. ........................................ 29/605; 29/595; 361/392; 361/421
[58] Field of Search ...................... 29/602.1, 605, 747, 29/593, 595; 73/146.5; 242/7.08, 25 R; 342/42, 50; 336/96, 198, 208; 361/392, 393, 400, 417, 419, 420, 421, 422

[56] References Cited

U.S. PATENT DOCUMENTS

| | | | |
|---|---|---|---|
| 3,836,842 | 9/1974 | Zimmermann et al. | 336/96 X |
| 4,074,227 | 2/1978 | Kalmus | 73/146.5 X |
| 4,142,289 | 3/1979 | Koethke | 29/747 X |
| 4,210,483 | 7/1980 | Kent | 29/605 X |
| 4,269,367 | 5/1981 | Minami et al. | 242/7.08 |
| 4,721,935 | 1/1988 | Gunnels et al. | 29/605 X |

Primary Examiner—Joseph M. Gorski
Assistant Examiner—Peter Dungba Vo
Attorney, Agent, or Firm—Rosenblum, Parish & Bacigalupi

[57] ABSTRACT

An improved automated method for the manufacture of alternatively sized passive transponder devices is presented which utilizes a single leadframe design and manufacturing process, including automated coil winding and wire-to-lead termination. A specially designed leadframe is prepared, with augmented leads, and is coated with a thin layer of silver. One or more semiconductor chips are bonded to individual assembly sites on the leadframe, after which the lead-die assembly is encapsulated by transfer molding. The cap and leads are singulated, and a bobbin is attached to the leads, which extend laterally from each individual molded cap. In an automated process, a conductive wire is attached to a first of the protruding leads, fly-wound around the bobbin core, and terminated by connection to a second of the protruding leads.

17 Claims, 4 Drawing Sheets

AUTOMATED METHOD FOR THE MANUFACTURE OF TRANSPONDER DEVICES BY WINDING AROUND A BOBBIN

BACKGROUND OF THE INVENTION

1. Field of the Invention

The present invention relates generally to the automated production of transponder devices, and more particularly to an automated method of manufacturing alternatively sized passive transponder devices using a single tape leadframe design and a bobbin for assembling the transponder.

2. Brief Description of the Prior Art

Transponders have been used for identification purposes for many years in the detection and identification of animate and inanimate objects. Initially, an operator, using a hand-held or other type of transmitter/reader, directs a beam of energy toward the transponder. This energy is usually in the form of an electromagnetic radio wave and acts to charge a minute capacitor, or similar energy storage component, within the transponder device. An integrated circuit, also a component of the transponder, contains identification information pertinent to a particular application. When activated by the electromagnetic wave, the information stored on this chip is electromagnetically retransmitted and can be received by an appropriate receiver thus enabling identification of the transponder device carrier.

Automated production of the transponder devices must overcome considerable difficulties. For example, since reduced size is desirable, an ultra fine copper wire must be wound around a core to operate effectively as an inductive coil. This wire typically has a diameter of only a few microns, and is thus quite difficult to manipulate with precision and care, even manually. Consequently, prior art methods of manufacture require a relatively slow core winding speed, and manual bonding of the wire ends directly to the integrated circuit surface. Thus, operator attention and interaction is continuously required to ensure the proper handling and connection of the delicate core wire. This is very costly, especially in terms of lost production time and the labor expense involved in constantly employing the highly trained technicians necessary for device construction.

Another drawback with prior technology is the difficulty and expense involved in manufacturing transponders of different sizes. This normally requires two distinct manufacturing sites, or, at a minimum, two separate manufacturing cycles and individual production set-ups. This, in turn, increases total production time and overhead, and greatly increases overall operating expenses.

SUMMARY OF THE INVENTION

It is, therefore, an object of the present invention to provide a method for manufacturing passive transponder devices which is fully automated.

It is another object of the present invention to provide a method of the type described wherein a single leadframe design can be used in the manufacture of transponders of varying sizes.

It is another object of the present invention to provide a method of the type described wherein automation of the conductive wire winding process is made possible, significantly reducing overall production time and cost.

Another object of the present invention is to provide a method of the type described wherein the ends of the conductive wire used in core winding can be terminated by conductive coupling to the leads of the leadframe using a fully automated bonding process.

Briefly, these and other objects of the present invention are achieved by first preparing a specially designed leadframe assembly from which multiple parts of varying sizes can be cut. Electrical components are bonded and wired to each individual site or frame of the leadframe, and this lead-die assembly is then encapsulated in a thermoplastic shell. The leadframe is then trimmed in a manner consistent with the size of the transponder in which an individual lead-die assembly is to be used, and an appropriate bobbin is attached at each distinct trimmed site. The individual bobbins and lead-die assemblies are then physically singulated from the leadframe, and one end of the core wire is attached to a first of the augmented leads using an automated wire tracking and bonding process. The bobbin core is subsequently wound with the core wire using an automated fly-winding means, after which the wire is terminated by connection to the second augmented lead. The assembled transponder is then packaged, preferably in a glass or plastic housing.

IN THE DRAWING

DETAILED DESCRIPTION OF THE PREFERRED EMBODIMENT

Figure 1:
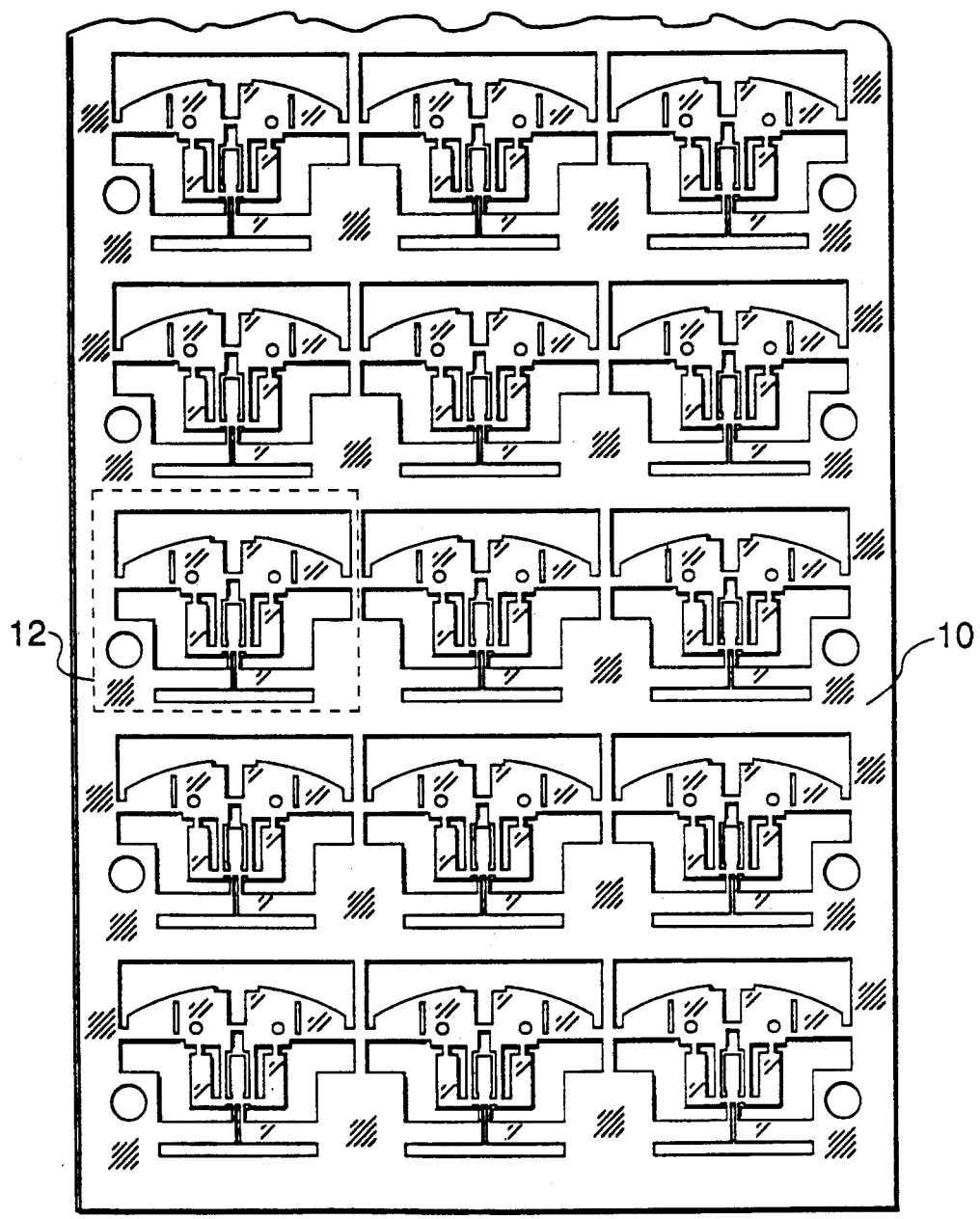
FIG. 1 is a top plan view of a portion of the specially designed leadframe used in transponder production in accordance with the method of the present invention.

Referring now to FIG. 1, shown is a portion of a tape leadframe 10 prepared in accordance with the method of the present invention. In full, leadframe 10 comprises an array of individual leadframe sites 12 arranged such that a number of individual sites are included within the confines of a single leadframe. Alternatively, the leadframe could be a tape instead of a sheet.

Figure 2A:
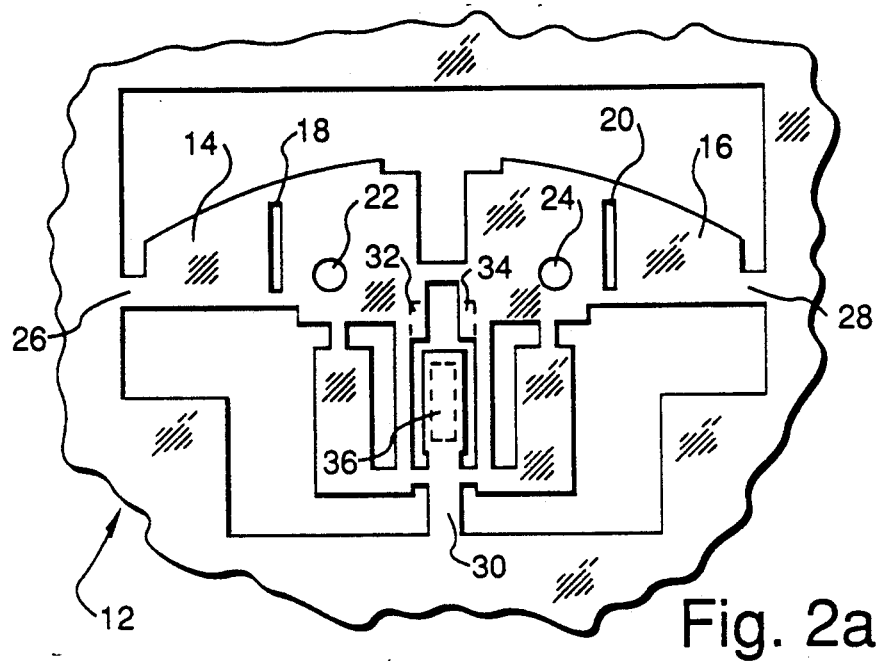
FIG. 2a is a top plan view of an individual site of the leadframe shown in FIG. 1, illustrating the die bonding areas.

Referring now to FIG. 2a, shown is the detail of an individual site 12 of leadframe 10. Augmented leads 14 and 16 are provided, with rectangular cut-outs 18 and 20, respectively, therein, and holes 22 and 24, respectively, therethrough. The body of the leads is connected to the leadframe by frame supports 26, 28 and 30. An important characteristic of leads 14 and 16 is their augmented width, which effectively provides an expanded surface area to which electrical connections can be made. As described below, this feature facilitates automated wire-to-lead connection capabilities that have heretofore been impracticable.

Figure 2B:
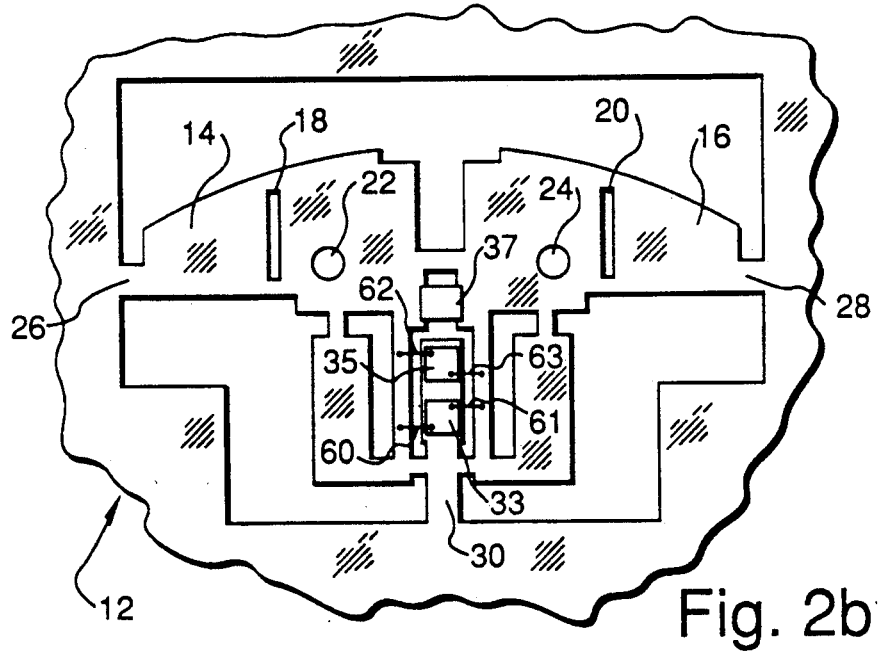
FIG. 2b is a top plan view of an individual site of the leadframe shown in FIG. 1, illustrating chip placement and electrical connection.

The transponder shown in the figures includes three circuit devices: a chip with identifying information 33; a zener protection chip 35; and a capacitor chip 37 (all shown in FIG. 2b). Alternatively, these functional elements could be combined in a single integrated circuit.

In accordance with the method of the present invention, the circuit devices are attached to the leadframe 10 with epoxy. This is a fully automated process using a bonding machine and technique known in the art. Referring again to FIG. 2a, when the leadframe is in the appropriate position within the bonding machine, the circuit devices are automatically deposited at each of the predetermined bonding sites 32, 34 and 36. This process is repeated for each of the individual sites 12, until the entire leadframe is similarly prepared. The individual sites may be prepared simultaneously.

The bonding machine automatically places the three chips in their proper positions on bonding sites 32, 34 and 36, as shown in FIG. 2b. At this point, the lead frames, with chips or "die" attached, can be loaded into a magazine and cured in bulk, in a convection oven, or cured individually in an ultraviolet curing tunnel oven. After curing, the die-loaded leadframes are ready for the next step in the production process.

The next step in the method of the present invention is the wire bonding of circuit devices 33 and 35 to the leadframe. In this operation, four fine gold wires are connected from the aluminum pads on the silicon dice 33 and 35 to the electrical connections on the leadframe. Referring to FIG. 2b, a first connecting wire 60 couples identification chip 33 to left lead 14, and a second connecting wire 61 couples chip 33 to right lead 16. Similarly, a third connecting wire 62 couples Zener protection chip 35 to lead 14, and a fourth connecting wire 63 couples chip 35 to lead 16. The wire bonding process is automatic, using pattern recognition, and is simplified by the augmented width of the leads. Capacitor chip 37 is electrically connected to the leadframe, in a position as shown in FIG. 2b, by use of the previously applied conductive die-bonding epoxy.

The next step in the method in accordance with the present invention is the transfer molding of the leadframes with die attached, and wire bonds complete. This is a common manufacturing technique, and thus will be described here only in general terms. The leadframes, prepared as described above, are loaded into magazines and inserted into a molding machine. Thermal-setting plastic is molded over the body of the leadframe-die assembly in order to protect the delicate electronics and fine-wire connections from physical and electrical damage. Part of the extraneous molded pot, runners and gates produced during the molding process can be removed at this time. However, this is normally done during the trimming and singulation operation, described below. The molding operation effectively produces a cap 41, shown in FIGS. 3a and 3b, which encapsulates the three chips and a portion of the leads, while a large portion of the leads are exposed and protrude from the sides of the cap, allowing wire connections thereto. Although shown as isolated in FIGS. 3a and 3b, the cap, with the lead-die assembly enclosed therein, is actually still attached to the main body of leadframe 10 at this point in the manufacturing process.

After the transfer molding is complete, the next step in the method in accordance with the present invention is the electrical isolation of the individual sites 12 from leadframe 10. Referring again to FIG. 2a, electrical isolation is accomplished by trimming the frame supports 26, 28 and 38 from the main body of the leadframe. This can be done manually, or can be automated using techniques well known in the industry.

It is possible, at this point, to perform necessary electrical testing of the individual lead-die assemblies produced at each site 12. Importantly, although the individual sites have been electrically isolated, they are still held within the leadframe by the molded runners and gates produced during the transfer molding process. This simplifies further automation in the handling of the leadframes as a complete unit during the subsequent steps in the manufacturing process.

The next step in the method according to the present invention is the singulation trimming operation. Singulation is achieved physically by using an automated mechanical punching device which stamps the cap and leads from the body of the leadframe. It is at this point in the overall manufacturing process that differentiation is made between the differently sized transponder devices. Referring again to FIG. 2a, a first larger sized transponder device is formed by singulating the cap-enclosed lead-die assembly from the molded runners and gates at the same position as that in which electrical isolation was performed, at frame supports 26 and 28. Thus, after singulation, leads 14 and 16 extend fully to the internal edge of site 12, to the position of previously connected supports 26 and 28. This allows the maximum surface area of the leads to be utilized for the bonding of the coil wire ends. A second smaller sized transponder device is formed by singulating the cap-enclosed lead-die assembly from the molded runners and gates through the center of rectangular cut-outs 18 and 20, and parallel to the longitudinal axis thereof. That is, the leads would be singulated by cutting through the cut-outs 18 and 20 such that only the material at the extreme ends thereof would actually be cut. This leadframe design facilitates accuracy and consistency in the singulation process, in addition to making the actual physical separation easier to accomplish. The remaining surface area of the leads provide access for the connection of the coil wire ends. In either singulation alternative, the individual cap-enclosed lead-die assemblies of each site 12 are now separated from the main body of the leadframe, and are ready for attachment to the bobbins, as described below.

Figure 3A:
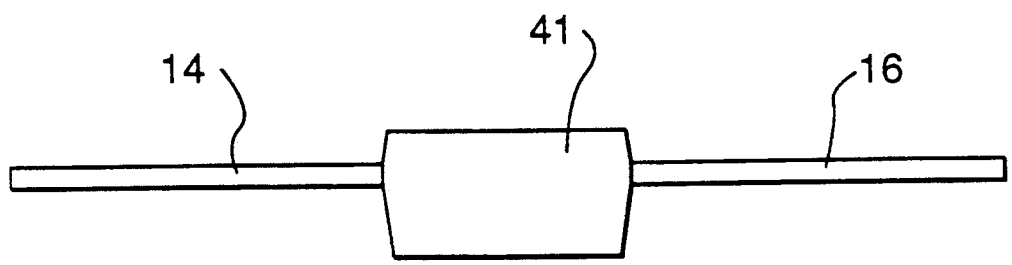
FIG. 3a is a side elevational view of the singulated molded cap with the lead-die assembly enclosed, illustrating a first alternative lead-size embodiment in accordance with the method of the present invention.
Figure 3B:
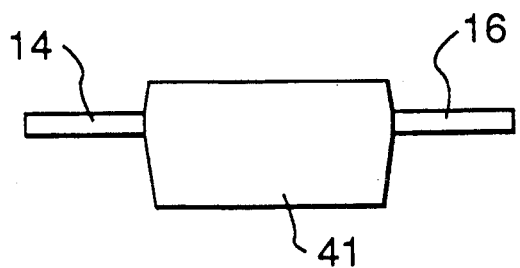
FIG. 3b is a side elevational view of the singulated molded cap with the lead-die assembly enclosed, illustrating a second alternative lead size embodiment in accordance with the method of the present invention.

Referring to FIGS. 3a and 3b, shown are side elevational views of the alternatively sized cap-enclosed lead-die assemblies, as formed using the above-described processes. FIG. 3a shows the larger assembly with the full surface area of leads 14 and 16 intact. FIG. 3b is representative of the smaller cap-enclosed lead-die assembly, which provides the shortened leads 14 and 16 for the wire bonding. In either case, the width of leads 14 and 16 is sufficient to accommodate fully automated connection of the fine core wire thereto.

Figure 4A:
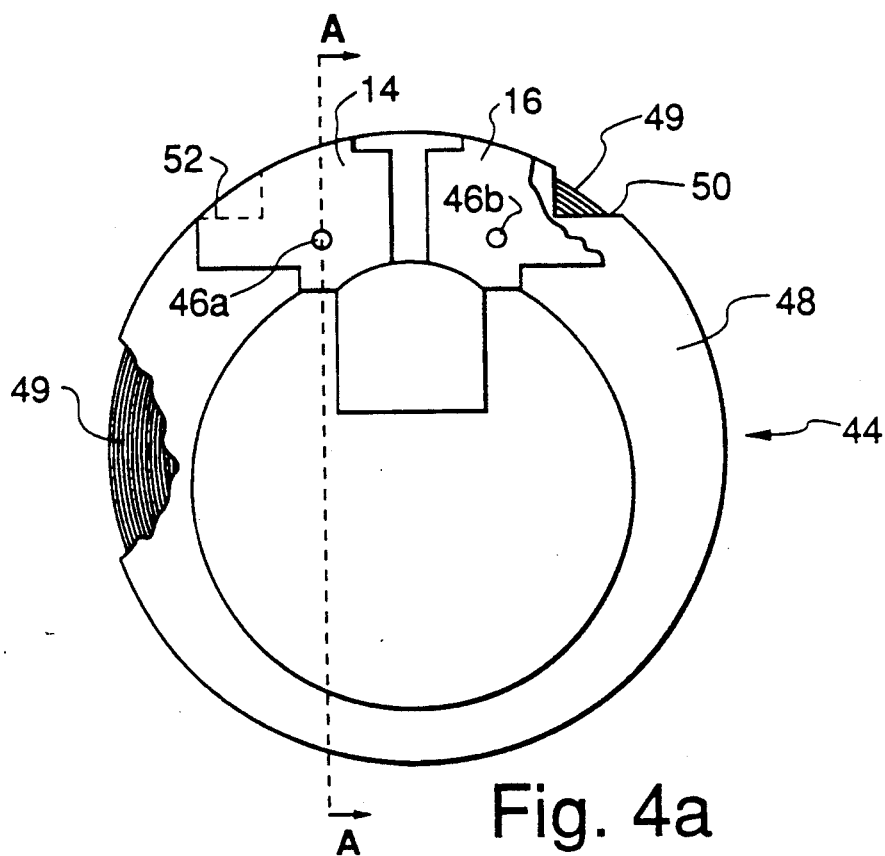
FIG. 4a is a partially broken top plan view of the singulated cap and lead-die assembly as it appears attached to the bobbin.

The next step in the method in accordance with the present invention is that of bobbin attachment. Referring now to FIG. 4a, shown is a bobbin 44 with the above-described fully singulated cap-enclosed lead-die assembly attached thereto. An individual bobbin 44 is disposed in a predetermined position relative to an individual cap-enclosed lead-die assembly. The bobbins include one or more connecting and positioning pins 46, shown in FIG. 4b, which project perpendicularly upward from a flattened outer surface 48 of the bobbin. In the presently preferred embodiment, each bobbin 44 is provided with two separate positioning and connecting pins 46a and 46b, shown in FIG. 4b, for connection to leads 14 and 16, respectively.

The pins 46a and 46b are automatically positioned within the holes 22 and 24 of leads 14 and 16, respectively, such that the leads lie flat against the upper surface 48 of the bobbin, and the pins extend therethrough. Pins 46a and 46b can be used solely for positioning of the bobbin against the leads, or they can also be used as a means of connecting the leads and bobbin together. If the pins are used solely for positioning, the leads and bobbin can be connected together in any suitable fashion, such as with epoxy or a like adhesive. In this manner, the pins would provide a means for correctly orienting the bobbin against the leads via alignment through holes 22 and 24. Alternatively, the pins can be used for both positioning and connection of the bobbin to the leads, by heat riveting or otherwise attaching the pins within holes, such that a solid and sturdy connection is made therebetween.

As can be seen in the drawing of FIG. 4a, in the preferred embodiment the inner and outer radii of bobbin 44 are not symmetrically concentric. That is, the central radial axis of the outer diameter of surface 48 is parallel to, but not collinear with, the central radial axis of the inner diameter of surface 48. This offset provides for a greater surface area on one portion of surface 48 which in turn accommodates connecting pins 46a and 46b, and connection cut-outs 50 and 52 (the latter being represented by the phantom line in FIG. 4a). These cut-outs are included to accommodate the twin wire termination process described in further detail below.

Figure 4B:
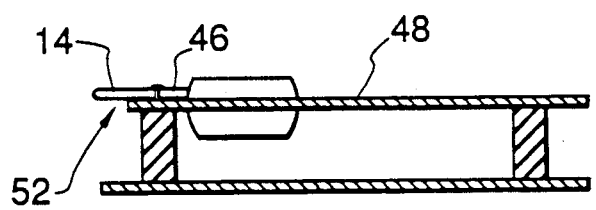
FIG. 4b is a cross-sectional view of the illustration in FIG. 4a, taken along the line AA.

FIG. 4b is a cross-sectional view of the bobbin 44 as it appears when attached to leads 14 and 16, via the connecting pins 46a and 46b. Note that lead 14 extends over cut-out 52 such that the bottom surface thereof is exposed to the bobbin core winding area. Lead 16, in a similar manner, extends over cut-out 50 such that the bottom surface of lead 16 is also exposed to the bobbin core winding area (not shown in FIG. 4b).

With the bobbin now mounted to the leads, the next step in the method of the present invention is coil winding and wire-to-lead attachment. Because of the fine size of the wire used in most transponder devices, i.e., in the order of a few to several microns, automated coupling of the wire ends to the die has been heretofore impracticable. In the prior art methods, manual wire manipulation and bonding is necessary to ensure that the proper connections are effectively made. However, according to the method of the present invention, these connections can be automated. By continuously dispensing the wire from a relatively small syringe-like tube, constant tracking of wire placement is realized during the full operation of lead bonding and coil winding. This tracking, in conjunction with the augmented surface area of the exposed leads, accommodates full process automation, as described below.

Initially, wire 49 is held within the syringe-like tube and is placed against the bottom surface of lead 14, which is exposed by cut-out 52. An electrode automatically descends and presses wire 49 against this lead, liquefying a thin coating of silver thereon. When the electrode is automatically removed, after a predetermined contact time, the silver solidifies and physically bonds the wire to the lead. Because of the greater surface area of the lead, as compared to a bonding pad directly on the die, and because the wire position is precisely known, this bonding process can be performed accurately and effectively, without operator intervention. Of course, alternative means for attaching the wire to the lead may be used.

After bonding the wire to the first lead, a flywheel is used for automatically "fly-winding" wire 49 around the center portion of the bobbin at a speed between 30,000 to 50,000 rpm. Winding at this speed is made possible by the lead bonding technique employed in the production process, and by the use of the narrow tube for the wire dispensation. Upon completion of the coil winding, the free wire end, still held within the tube, is bonded to the lead 16, the bottom surface of which is exposed by cut-out 50. The wire-dispensing tube is placed next to the lead 16, and an electrode automatically descends and bonds the wire to the exposed augmented lead. This again is made possible because the wire position is precisely known due to use of the syringe-like dispenser, and because of the expanded surface area available for bonding on the lead.

Whereas the preferred embodiment of the present embodiment of the present invention has been described above, it is contemplated that other alternatives and modifications may become apparent to those skilled in the art after having read the above disclosure. It is, therefore, intended that the appended claims be interpreted as covering all such alterations and modifications as fall within the true spirit and scope of the invention.

What is claimed is:

1. An automated method for manufacturing a passive transponder device, comprising:

providing a leadframe including a plurality of individual assembly sites each having a plurality of leads;

bonding an electronic identification device comprised of at least one integrated circuit chip to each said site;

electrically connecting each said identification device to said leads at each said site;

molding a cap around each said identification device and first portions of the leads at the site such that second portions of the leads protrude from said cap;

severing the second portions of said leads thereby disassociating each said cap from said leadframe;

attaching a bobbin to said second portion of said leads protruding from each said cap;

winding a conductive wire around each said bobbin; and conductively connecting each wire to the corresponding leads.

2. A method as described in claim 1 wherein each said identification device is conductively connected to said leads by a plurality of connecting wires.

3. A method as described in claim 2 further comprising the step of:

aligning said plurality of connecting wires and said leads using an automated pattern recognition means.

4. A method as described in claim 1 further comprising the step of:

aligning said connecting wires and said leads using an automated pattern recognition means.

5. A method as described in claim 1 wherein said bobbin includes a plurality of connecting pins which project upwardly from said bobbin and said leads include a corresponding plurality of holes, and further comprising the step of extending said pins through the holes in said leads during said attaching step, said pins being operative to position said bobbin against said leads and to attach said bobbin thereto.

6. A method as described in claim 1 wherein said winding step is accomplished by winding said conductive wire at a speed between 30,000 and 50,000 rpm.

7. A method as described in claim 1 further comprising the step of:
using a tubular applicator for dispensing said conductive wire such that the position of said wire is constantly determinable during said winding step and said connecting step.

8. A method as described in claim 1 wherein said severing step is accomplished by severing each said lead at different predetermined positions using an automated severing means, thereby producing devices with various lead sizes.

9. A method as described in claim 8 wherein said leads include a plurality of apertures for identifying positions at which said leads can be severed by said severing means and further for facilitating the severing of said leads by eliminating superfluous leadframe material.

10. An automated method for manufacturing passive transponder devices, comprising the steps of:
preparing a leadframe including a plurality of individual assembly sites, each site having a plurality of leads fabricated such that said leads can be cut to different predetermined sizes;
bonding an electronic identification device comprising at least one integrated circuit chip at each said site;
electrically connecting each said identification device to said leadframe;
molding a cap around each said identification device at each said site such that said leads extend laterally from each said cap;
severing said leads thereby disassociating each said cap from said leadframe and forming a plurality of singulated electronic devices;
affixing a bobbin to each said singulated device;
attaching first ends to lengths of conductive winding wire to a first lead extending from each singulated device;
winding each said length of wire around the corresponding bobbin; and
attaching a second end of said lengths of wire to a second lead extending from each singulated device.

11. A method as described in claim 10 further comprising the step of:
aligning said conductive wires and said leads using an automated pattern recognition means.

12. A method as described in claim 10 wherein said leadframe includes a plurality of apertures for identifying singulating positions at which said leads can be severed, and for facilitating the severing of said leads by eliminating superfluous leadframe material.

13. A method as described in claim 10 wherein said winding step is accomplished by winding said wire at a speed between 30,000 and 50,000 rpm.

14. A method as described in claim 10 further comprising the step of:
using a tubular applicator for dispensing said conductive winding wire such that the position of said wire is constantly determinable during said winding step and said connecting step.

15. A method as described in claim 10 wherein said bobbins each include a plurality of positioning pins and wherein said leads include a plurality of complementary positioning holes, and further comprising the step of inserting the pins of each bobbin into the positioning holes of a corresponding singulated device to position and secure the bobbin thereto.

16. A method as described in claim 10 wherein said identification devices are electrically connected to leads of said leadframe using a plurality of fine connecting wires.

17. A method as described in claim 16 further comprising the step of:
aligning said plurality of connecting wires and said leads using an automated pattern recognition means.

* * * * *